(No Model.)
C. W. GLIDDEN.
ROTARY TRIMMING TOOL FOR BOOTS OR SHOES.
No. 402,435. Patented Apr. 30, 1889.
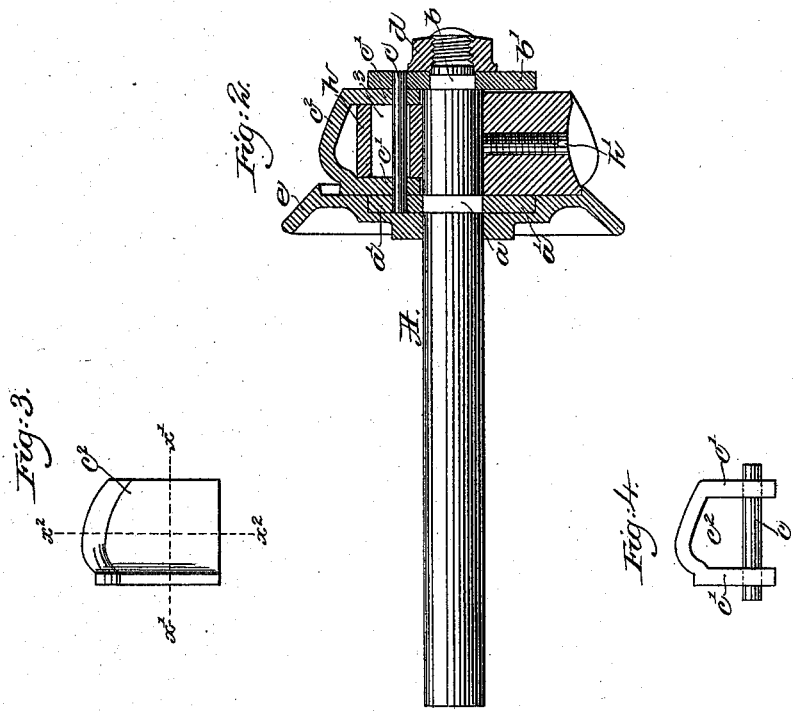
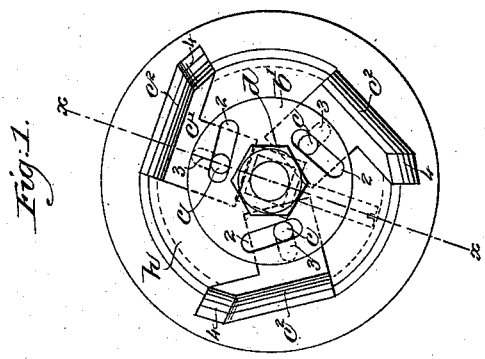
Witnesses.
John F. G. Prumbert
Frederick L. Emery
Inventor.
Charles W. Glidden,
by Crosby & Gregory Attys

UNITED STATES PATENT OFFICE.

CHARLES W. GLIDDEN, OF LYNN, ASSIGNOR TO JAMES W. BROOKS, TRUSTEE, OF CAMBRIDGE, MASSACHUSETTS.

ROTARY TRIMMING-TOOL FOR BOOTS OR SHOES.

SPECIFICATION forming part of Letters Patent No. 402,435, dated April 30, 1889.

Application filed August 20, 1888. Serial No. 283,197. (No model.)

*To all whom it may concern:*

Be it known that I, CHARLES W. GLIDDEN, of Lynn, county of Essex, State of Massachusetts, have invented an Improvement in Rotary Trimming-Tools for Heels, &c., of which the following description, in connection with the accompanying drawings, is a specification, like letters on the drawings representing like parts.

This invention has for its object to improve a rotary trimming-tool for trimming leather in the form of heels or otherwise, the present improvement relating more especially to the blades, which are of novel shape, whereby they may be cheaply made and readily ground, and always to the same angle or bevel.

Heretofore molded strap-like blades have been made concavo-convex in section both in the direction of their width and depth, measured from the head of the cutter to its cutting-edges.

My improved cutter or blade is made from a strap or strip of flat metal cut out to shape and bent transversely into approximately ⌒ shape to present ears substantially at right angles to the width of the blade portion, the said ears being parallel to each other, the central or blade portion being straight in its depth or from its heel to its beveled and sharpened edge. The ears have extended through them a pin, which between the ears passes through a slot in the cutter-head, the pin outside the ears entering slots in a cam-plate or plate fixed to the cutter-shaft.

Figure 1 is a front elevation of a rotary cutter embodying my invention. Fig. 2 is a section of the cutter in the line $x$, the cutter-shaft being in elevation. Fig. 3 is a plan view of one of the blades, and Fig. 4 an end view thereof.

The shaft A has two many-sided or squared portions, $a\ b$, which receive two cam-plates, $a'\ b'$, and hold them so that they rotate in unison with the shaft; but instead of the squared portions I may fix the cam-plates to the shaft in any other well-known manner. Each of these cam-plates has like secant slots, 2, which receive the ends of like pins, $c$, extended through the ears $c'$ of the blades $c^2$, the said pins being extended through substantially radial slots 3 in the hub $h$ of the cutter, which is fastened to the shaft A by a set-screw, $h'$. The ears $c'$ straddle the hub and enter substantially radial grooves therein.

By loosening the hub $h$ and turning it on the shaft, so as to change their relative positions, the ends of the pins $c$ are made to travel more or less in the slots 2 of the plates $a\ b$, and as a result thereof the blades are simultaneously moved outwardly or the cutter is uniformly expanded to be ground back to standard diameter.

The blades are made from a flat strap or strip of metal cut into shape and bent transversely over a suitable former to leave the blade in the direction of its width or in the line $x'$, Fig. 3, of the form or pattern desired for the heel, the blade in the direction of the width thereof, as shown, by the dotted line $x^2$ or from heel to cutting-edge being straight, the cutting-edge 4 being beveled from the inner side of the blade outwardly and backwardly, as shown in Fig. 1.

Heretofore strap-like cutter-blades have commonly been of concavo-convex shape in the direction of the dotted line $x^2$, thus making them more difficult and expensive to produce and harder to grind, and such blades have commonly been ground from their inner sides forward.

My improved blade is readily ground with the outer face of the cutter nearest the grinding-tool and beveled, as shown in Fig. 1. The blades may be readily ground on and without removing them from the cutter-head.

The nut $d$ holds the cutter-head in place, and consequently the blades in adjusted position, and at the rear side of the head shaft has mounted on it the usual tread-guard, $e$.

In another application, Serial No. 252,993, I have shown a slotted head and blades screwed to so-called "back pieces" having ears; but herein the blades and ears are in one piece.

I claim—

1. In a rotary trimming-tool, the two slotted cam-plates, the slotted hub, and the strap cutter-blades having ears, combined with pins extended through the slots in the head, through the ears of the cutter-blades, and into the slots of the cam-plates, whereby change of relative positions of the hub and cam-plates effects the simultaneous adjustment of the blades, substantially as described.

2. The combination, with the hub of a rotary cutter, of strap-like blades bent at right angles to their width to present ears the flat faces of which are substantially parallel to each other and to the face of the hub to which they are secured, the said blades being made substantially straight in the direction of their depth, as from heel to cutting-edge, the said cutting-edge being beveled from the inner side of the blade backwardly toward the heel thereof, substantially as described.

3. A rotary cutter containing blades molded in the direction of their width to correspond with the shape to be given to the heel, and substantially straight from their heels to their cutting-edges, and beveled, as at 4, as shown and described.

In testimony whereof I have signed my name to this specification in the presence of two subscribing witnesses.

CHARLES W. GLIDDEN.

Witnesses:
H. P. FAIRFIELD,
CHAS. H. BENJAMIN.